(12) United States Patent
Akkarakaran et al.

(10) Patent No.: US 8,102,935 B2
(45) Date of Patent: Jan. 24, 2012

(54) ESTIMATION OF DATA-TO-PILOT RATIO IN A WIRELESS COMMUNICATION SYSTEM

(75) Inventors: Sony Akkarakaran, San Diego, CA (US); Min Dong, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 910 days.

(21) Appl. No.: 12/123,320

(22) Filed: May 19, 2008

(65) Prior Publication Data
US 2009/0286497 A1 Nov. 19, 2009

(51) Int. Cl.
*H04L 5/12* (2006.01)
*H04L 23/02* (2006.01)
(52) U.S. Cl. .................. 375/267; 375/261
(58) Field of Classification Search .......... 455/13.4, 455/226.1, 137, 562.1; 375/E1.029, E1.032, 375/266, 332, 341, 224, E1.002; 342/378, 342/382, 380; 370/331, 498, 334, 150, 344, 370/347
See application file for complete search history.

(56) References Cited

U.S. PATENT DOCUMENTS

| | | | |
|---|---|---|---|
| 6,973,098 B1 * | 12/2005 | Lundby et al. | 370/491 |
| 6,990,153 B1 * | 1/2006 | Farhang-Boroujeni et al. | 375/260 |
| 2002/0067761 A1 * | 6/2002 | Kong et al. | 375/148 |
| 2003/0002450 A1 * | 1/2003 | Jalali et al. | 370/294 |
| 2006/0229089 A1 | 10/2006 | Tokgoz et al. | |
| 2007/0121763 A1 * | 5/2007 | Bui | 375/340 |

FOREIGN PATENT DOCUMENTS

| | | |
|---|---|---|
| EP | 1971093 A1 | 9/2008 |
| WO | WO2006132593 | 12/2006 |
| WO | WO2008042946 | 4/2008 |

OTHER PUBLICATIONS

International Search Report & Written Opinion—PCT/US2008/077194, International Search Authority—European Patent Office—Oct. 9, 2009.

(Continued)

*Primary Examiner* — David C. Payne
*Assistant Examiner* — Wednel Cadeau
(74) *Attorney, Agent, or Firm* — Donald C. Kordich

(57) ABSTRACT

Techniques for estimating data-to-pilot ratio are described. A terminal may receive pilot sent to multiple terminals and may receive data sent specifically to the terminal. The terminal may estimate channel gain and noise variance based on the received pilot. The terminal may then estimate a data-to-pilot ratio based on the received data y and the estimated channel gain h and noise variance $\sigma^2$. In one design, the terminal may determine a metric $$\frac{|y|^2 - \sigma^2}{|h|^2}$$

and may average the metric across multiple received data symbols to obtain the data-to-pilot ratio. The terminal may receive pilot and data via multiple antennas and may combine the received data across these antennas to obtain combined data. The terminal may estimate signal-to-noise-and-interference ratio (SINR) based on the received pilot from the multiple antennas and may then estimate the data-to-pilot ratio based on the combined data and the estimated SINR.

31 Claims, 4 Drawing Sheets

OTHER PUBLICATIONS

Mingxi Fan; Ghosh D; Bhushan N; Attar R; Lott C; Au J: "On the reverse link performance of cdma2000 IxEV-DO revision a system" Communications, 2005. ICC 2005. 2005 IEEE International Conference on Seoul, Korea May 16-20, 2005, 20050516-20050520 Piscataway, NJ, USA,IEEE, vol. 4, May 16, 2005, pp. 2244-2250, XP010826268 ISBN: 9780780389380 abstract paragraph [II.B]-paragraph [III.A]., paragraph [0IV.].

TIA-1121.001 "Physical Layer for Ultra Mobile Broadband (UMB) Air Interface Specification," 3GPP2 C.S0084-001 Version 2.0 (Aug. 2007).

* cited by examiner

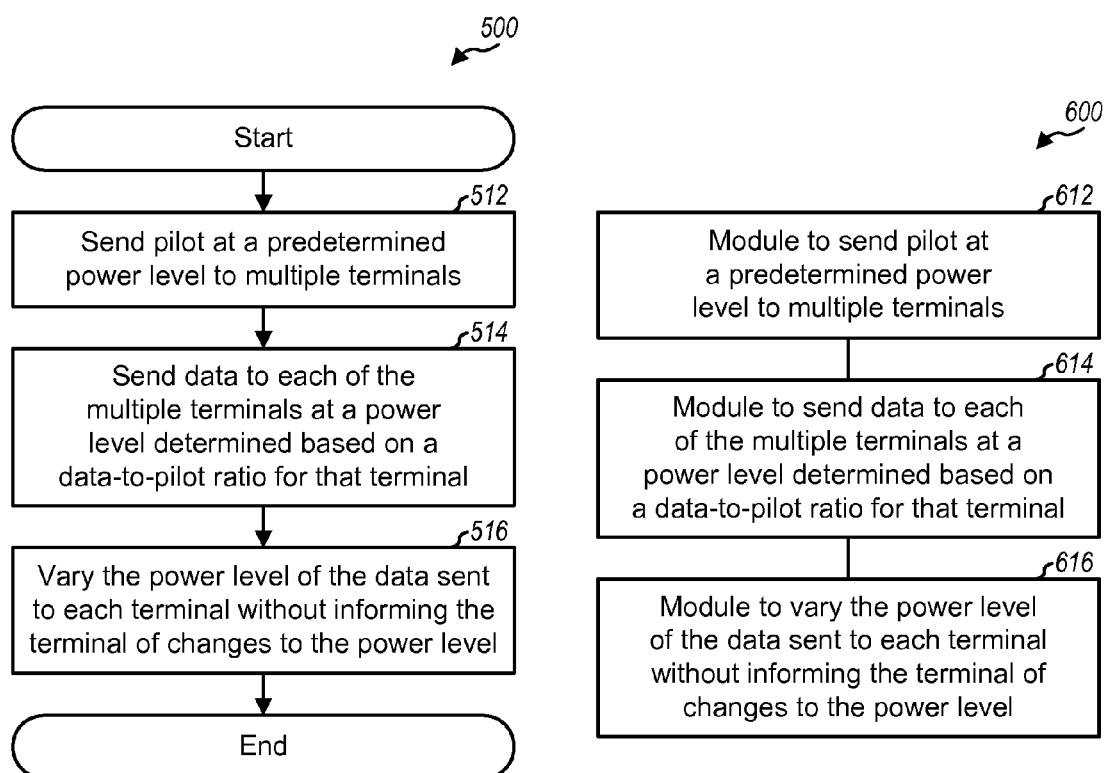

US 8,102,935 B2

ESTIMATION OF DATA-TO-PILOT RATIO IN A WIRELESS COMMUNICATION SYSTEM

BACKGROUND

I. Field

The present disclosure relates generally to communication, and more specifically to techniques for estimating data-to-pilot ratio (D2P) in a wireless communication system.

II. Background

Wireless communication systems are widely deployed to provide various communication services such as voice, video, packet data, messaging, broadcast, etc. These systems may be multiple-access systems capable of supporting multiple users by sharing the available system resources. Examples of such multiple-access systems include Code Division Multiple Access (CDMA) systems, Time Division Multiple Access (TDMA) systems, Frequency Division Multiple Access (FDMA) systems, Orthogonal FDMA (OFDMA) systems, and Single-Carrier FDMA (SC-FDMA) systems.

In a wireless communication system, a base station may transmit traffic data, control data, and pilot to one or more terminals. As used herein, the term "data" can refer to traffic data or control data. Traffic data is also commonly referred to as user data, packet data, etc. Control data is also commonly referred to as overhead data, signaling, etc. Pilot is data that is known a priori by both the base station and the terminals. A terminal may use the pilot for various purposes such as channel estimation, demodulation, decoding, etc.

The base station may transmit data at a particular power level and may transmit pilot at the same or different power level to a terminal. The terminal may need to ascertain the data-to-pilot ratio (D2P), which is the ratio of transmit power for data to transmit power for pilot. D2P may also be referred to as traffic-to-pilot ratio (T2P) for traffic data, overhead-to-pilot ratio (O2P) for control data, power offset between data and pilot, etc. For example, D2P may be used by a demodulator and/or a decoder to calculate their decision metrics. It is desirable to accurately estimate D2P when this is not known.

SUMMARY

Techniques for estimating data-to-pilot ratio based on received pilot and data are described herein. In one design, a terminal may receive pilot (e.g., sent on a shared channel to multiple terminals) and may also receive data (e.g., sent on the shared channel to the terminal). The terminal may estimate channel gain and noise variance based on the received pilot. The terminal may then estimate a data-to-pilot ratio based on the received data and the estimated channel gain and noise variance.

In one design, the terminal may determine a first quantity (e.g., $|y|^2 - \sigma^2$) based on the received data y and the estimated noise variance $\sigma^2$. The terminal may determine a second quantity (e.g., $|h|^2$) based on the estimated channel gain h. The terminal may then estimate the data-to-pilot ratio based on the first and second quantities.

The received data may comprise multiple received data symbols. In one design, the terminal may determine a metric $$\frac{|y|^2 - \sigma^2}{|h|^2},$$

where i is an index for received data symbols. The terminal may average the metric across multiple received data symbols and determine the data-to-pilot ratio based on the averaged metric. In another design, the terminal may average the numerator of the metric across the received data symbols, average the denominator of the metric across the received data symbols, and determine the data-to-pilot ratio based on the averaged numerator and the averaged denominator. In yet another design, the terminal may scale the numerator of the metric with a scaling factor (e.g., $|h_i|^2$), scale the denominator of the metric with the scaling factor, average the scaled numerator across the received data symbols, average the scaled denominator across the received data symbols, and determine the data-to-pilot ratio based on the averaged scaled numerator and the averaged scaled denominator.

The terminal may receive pilot and data via multiple receive antennas and may combine the received data across these antennas, e.g., with maximal ratio combining (MRC), to obtain combined data. The terminal may estimate channel gain and noise variance for each receive antenna based on the pilot received via that antenna. The terminal may estimate signal-to-noise-and-interference ratio (SINR) based on the estimated channel gain and noise variance for the multiple receive antennas. The terminal may then estimate the data-to-pilot ratio based on the combined data z and the estimated SINR. In one design, the terminal may estimate the data-to-pilot ratio based on a metric $$\frac{|z_i|^2 - SINR_i}{SINR_i^2}$$

using any of the averaging schemes described above.

The terminal may use the data-to-pilot ratio for various purposes such as demodulation and decoding. Various aspects and features of the disclosure are described in further detail below.

BRIEF DESCRIPTION OF THE DRAWINGS

FIG. 5 shows a process for transmitting data and pilot.

FIG. 6 shows an apparatus for transmitting data and pilot.

DETAILED DESCRIPTION

The techniques described herein may be used for various wireless communication systems such as CDMA, TDMA, FDMA, OFDMA and SC-FDMA systems. The terms "system" and "network" are often used interchangeably. A CDMA system may implement a radio technology such as cdma2000, Universal Terrestrial Radio Access (UTRA), etc. An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM®, etc. Long Term Evolution (LTE) uses E-UTRA, which employs OFDMA on the downlink and SC-FDMA on the uplink. UTRA, E-UTRA and LTE are described in documents from an organization named "3rd Generation Partnership Project" (3GPP). cdma2000 and UMB are described in documents from an organization named "3rd Generation Partnership Project 2" (3GPP2). For clarity, certain aspects of the techniques are described below for UMB, and UMB terminology is used in much of the description below. UMB is described in 3GPP2 C.S0084-001, entitled "Physical Layer for Ultra Mobile Broadband (UMB) Air Interface Specification," August 2007, which is publicly available.

Figure 1:
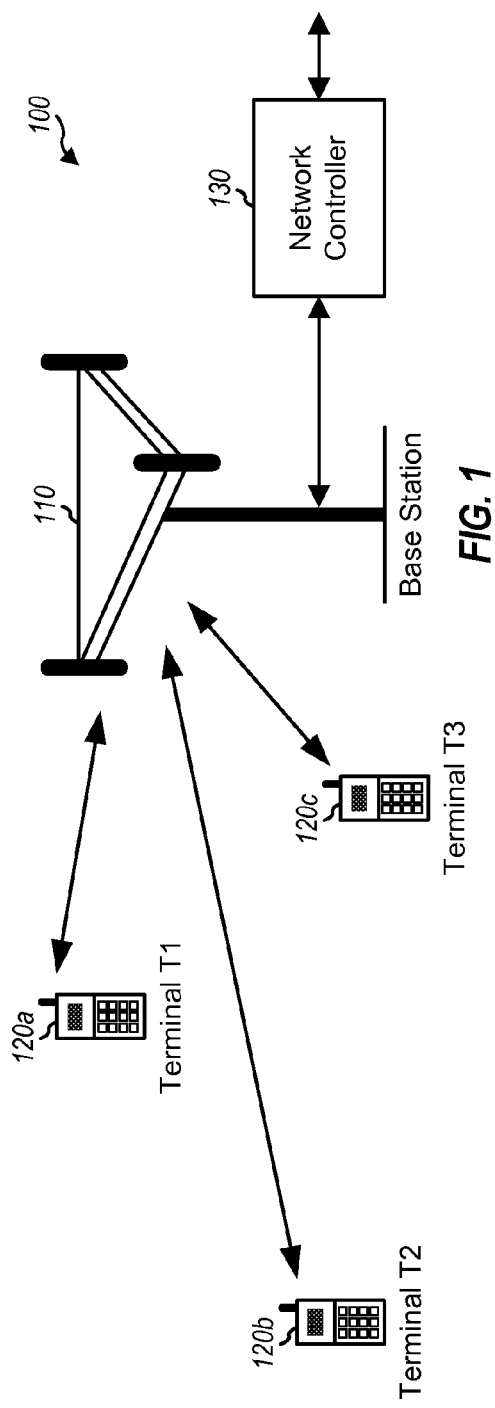
FIG. 1 shows a wireless communication system.

FIG. 1 shows a wireless communication system 100, which may also be referred to as an access network (AN). For simplicity, only one base station 110, three terminals 120a, 120b and 120c, and one network controller 130 are shown in FIG. 1. A base station is a station that communicates with the terminals. A base station may also be referred to as an access point, a Node B, an evolved Node B, etc. Network controller 130 may couple to a set of base stations and provide coordination and control for these base stations. Network controller 130 may be a single network entity or a collection of network entities.

A terminal may be stationary or mobile and may also be referred to as an access terminal (AT), a mobile station, a user equipment, a subscriber unit, a station, etc. A terminal may be a cellular phone, a personal digital assistant (PDA), a wireless communication device, a wireless modem, a handheld device, a laptop computer, a cordless phone, etc. A terminal may communicate with a base station on the forward link and/or reverse link. The forward link (or downlink) refers to the communication link from the base station to the terminal, and the reverse link (or uplink) refers to the communication link from the terminal to the base station. The techniques described herein may be used by a terminal to estimate D2P for the forward link as well as by a base station to estimate D2P for the reverse link. For clarity, much of the description below is for estimation of D2P by a terminal.

The base station may transmit data and dedicated pilot to each terminal. Each terminal may use its dedicated pilot for channel estimation and for demodulation and decoding of its data. Different terminals may be at different locations and may observe different channel conditions. The base station may set the power levels of data and pilot for each terminal such that the data and pilot can be received with sufficient strength at that terminal. The D2P for each terminal may be fixed and may be signaled to and known by the terminal.

The system may support forward link control channels to send control data to the terminals. If the control channels are unicast channels sent to individual terminals, then sending a small payload and dedicated pilot on a separate control channel to each terminal may be prohibitively expensive and may represent inefficient use of the available radio resources.

To improve efficiency, the base station may transmit data to each terminal and common pilot to multiple terminals. For example, a shared control channel may be used to send control data in a unicast manner to each terminal and common pilot in a multicast or broadcast manner to all terminals receiving the shared control channel. Each terminal may use the common pilot for channel estimation and for demodulation and decoding of its unicast control data. The power level of the common pilot may be set such that even the terminal with the worst channel conditions can receive the pilot with sufficient strength. The power level of the control data for each terminal may be set separately based on the channel conditions of that terminal. Similarly, a shared data channel may be used to send traffic data in a unicast manner to each terminal and common pilot in a multicast or broadcast manner to all terminals receiving the shared data channel.

Figure 2:
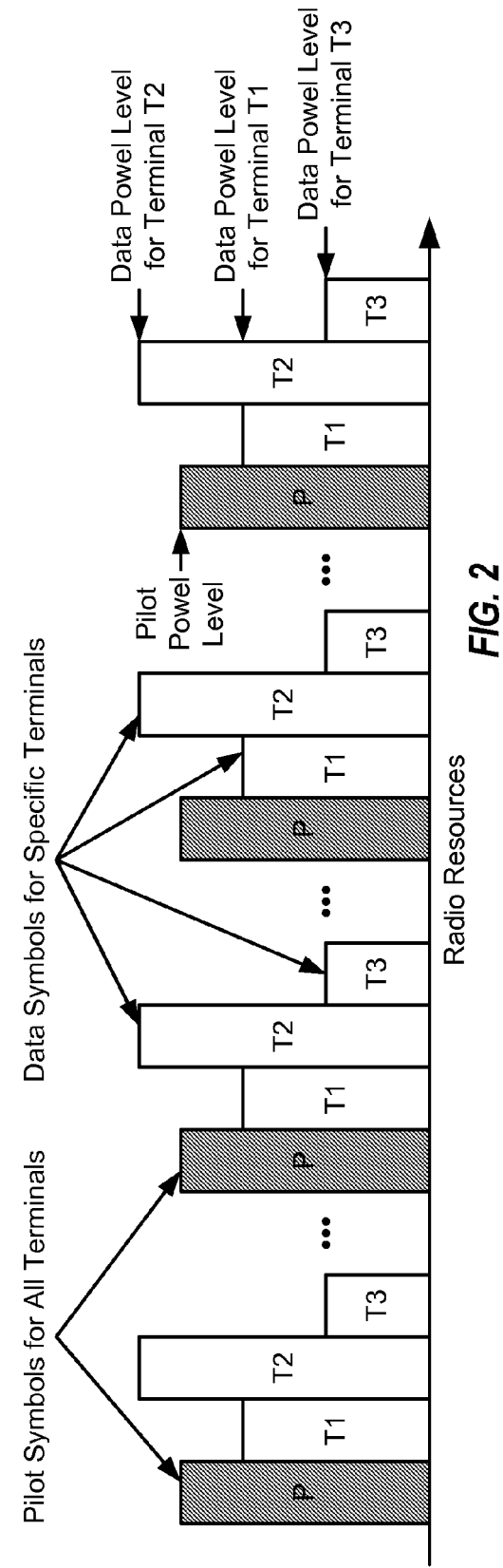
FIG. 2 shows transmission of a shared channel to multiple terminals.

FIG. 2 shows an example transmission of a shared channel to multiple terminals. Data symbols and pilot symbols may be sent to the terminals on radio resources used for the shared channel. The radio resources may comprise resource elements in a system utilizing orthogonal frequency division multiplexing (OFDM) or single-carrier frequency division multiplexing (SC-FDM). Each resource element may correspond to one subcarrier in one symbol period. The radio resources may also correspond to other types of resources for other multiplexing schemes.

In the example shown in FIG. 2, pilot symbols (labeled with "P") may be sent at a predetermined power level and may be distributed across the radio resources used for the shared channel. Data symbols for each terminal may be sent at a power level selected for that terminal and may also be distributed across the radio resources. As shown in FIG. 2, different power levels may be used for the data symbols for different terminals. The D2P for each terminal may be dependent on the power level of the data symbols for that terminal and the power level of the pilot symbols common to all terminals receiving the shared channel.

In another design, different groups of pilot symbols may be used for different groups of terminals. The base station may set the power level of each group of pilot symbols based on a maximum allowed D2P among all terminals using that group of pilot symbols in order to ensure good demodulation performance and improve power efficiency. Different power levels may be used for different groups of pilot symbols, and the pilot power level may vary across the radio resources used for the shared channel.

The data power level for each terminal may be adjusted based on the channel conditions of that terminal, and the D2P of the terminal may vary correspondingly. In a mobile environment with fast-changing channel conditions, the D2P of each terminal may vary rapidly to keep track with the changing channel conditions. The D2P variations may be relatively fast, and signaling D2P values at a fast rate may consume excessive radio resources.

In an aspect, D2P may be estimated based on received pilot and data. The received data may comprise traffic data and/or control data and may be sent to a specific terminal. The pilot may comprise common pilot sent to multiple terminals and/or dedicated pilot sent to a specific terminal. D2P may be estimated based on various schemes, as described below.

The received data symbols at a terminal may be expressed as:

$$y_i = h_i x_i \sqrt{D2P} + n_i, \quad\quad\quad\quad \text{Eq (1)}$$

where i is an index for data symbols transmitted at the same D2P to the terminal, $x_i$ is the i-th transmitted data symbol, $h_i$ is a complex channel gain for transmitted data symbol $x_i$, D2P is the ratio of data power to pilot power, $n_i$ is additive random noise uncorrelated to $x_i$ and having a variance of $\sigma_i^2$, and $y_i$ is a received data symbol.

The transmitted data symbols may have power equal to D2P times the pilot power for M-ary phase shift keying (M-PSK). The transmitted data symbols may have an average power equal to D2P times the pilot power for quadrature amplitude modulation (QAM).

The terminal may estimate the channel gain $h_i$ and the noise variance $\sigma_i^2$ based on received pilot symbols using various channel estimation techniques known in the art. For simplicity, the following description assumes no channel estimation errors, so that the estimated channel gain and noise variance are equal to the actual channel gain and noise variance.

In one design, D2P may be estimated based on a received data symbol and the estimated channel gain and noise variance, as follows:

$$D2P\_est_i = \frac{|y_i|^2 - \sigma_i^2}{|h_i|^2}, \quad\quad\quad\quad \text{Eq (2)}$$

where $D2P\_est_i$ is an unbiased estimate of D2P, so that the expectation of $D2P\_est_i$ is equal to D2P. Since the estimated $\sigma_i^2$ may be larger than $|y_i|^2$, the numerator term in equation (2) may be constrained to be equal to zero or larger and may be given as $\max\{|y_i|^2 - \sigma_i^2, 0\}$.

Equation (2) may be used to estimate D2P even when there is only one transmitted data symbol, in which case index i takes on only one value. Equation (2) assumes no channel estimation errors. In practice, the estimated channel gain and noise variance typically have some errors. The D2P estimate from equation (2) may be relatively accurate if the channel estimation errors are small.

Multiple data symbols may be transmitted to the terminal. A more accurate D2P estimate may be obtained by averaging across these multiple data symbols. In one design, D2P may be estimated based on multiple received data symbols as follows:

$$\text{D2P\_est}_a = \frac{|y_i|^2 - \sigma_i^2}{|h_i|^2}. \qquad \text{Eq (3)}$$

In another design, D2P may be estimated based on multiple received data symbols as follows:

$$\text{D2P\_est}_b = \frac{\sum_i (|y_i|^2 - \sigma_i^2)}{\sum_i |h_i|^2}. \qquad \text{Eq (4)}$$

In yet another design, D2P may be estimated based on multiple received data symbols as follows:

$$\text{D2P\_est}_c = \frac{\sum_i (|y_i|^2 - \sigma_i^2) \cdot |h_i|^2}{\sum_i |h_i|^4}. \qquad \text{Eq (5)}$$

The numerator term in each of equations (3) to (5) may be constrained to be non-negative (i.e., equal to zero or larger) in several manner. In one design, the averaging may be performed as shown in equations (3) to (5), and the result may be constrained to be non-negative, e.g., set to zero if it is negative. In another design, the numerator term for each value of index i may be constrained to be non-negative, and the averaging may be performed on non-negative quantities. The numerator term may also be constrained to be non-negative in other manners.

The D2P estimates from equations (3) to (5) are unbiased when the estimated channel gain and noise variance have no errors. Equation (5) gives more weight to received data symbols (or observations) with high channel quality. Hence, the D2P estimate from equation (5) may have lower error variance and better performance. Sufficient arithmetic range and precision should be used to account for faster bit growths associated with computing the 4-th power of the channel gains in the denominator. Equation (4) has lower computation complexity than equation (5) and may provide comparable performance especially if there is not too much variations among the channel gains.

Equations (3) to (5) represent three designs for estimating D2P by averaging across multiple data symbols. The averaging may also be performed in other manners. For example, the numerator term $(|y_i|^2 - \sigma_i^2)$ and the denominator term $|h_i|^2$ may be scaled by other powers of $|h_i|$, by other scaling factors, etc. Furthermore, the averaging may be performed over any number of data symbols having the same D2P. For example, the base station may send a forward link control channel (e.g., an CQI channel) carrying multiple data symbols at the same power level on different tiles to the terminal. The pilots in different tiles may have different power levels. The data symbols in each tile may have the same D2P while the data symbols in different tiles may have different D2Ps. The averaging may be performed accordingly.

Equations (2) to (5) show the noise variance $\sigma_i^2$ being specific for each data symbol and denoted by subscript i. The noise variance may also be estimated for all data symbols and given as $\sigma^2$. This noise variance may be used for each data symbol in equations (2) to (5), so that $\sigma_i^2 = 2$ for all values of i. In general, the noise variance may be estimated for each received data symbol, all received data symbols, or each subset of received data symbols.

The terminal may have multiple receive antennas and may receive the transmitted data symbols via these multiple receive antennas. The received data symbols from each receive antenna may be expressed as:

$$y_{ij} = h_{ij} \cdot x_i \cdot \sqrt{D2P} + n_{ij}, \qquad \text{Eq (6)}$$

where j is an index for receive antennas at the terminal, $h_{ij}$ is a complex channel gain for data symbol $x_i$ at receive antenna j, $n_{ij}$ is additive random noise for data symbol $x_i$ at receive antenna j, and $y_{ij}$ is a received data symbol from receive antenna j.

The terminal may combine the received data symbols from all receive antennas with maximal ratio combining (MRC), as follows:

$$z_i = \sum_j \frac{h_{ij}^*}{\sigma_{ij}^2} y_{ij}, \qquad \text{Eq (7)}$$

where $\sigma_{ij}^2$ is the variance of the noise $n_{ij}$ for receive antenna j, $h_{ij}^*/\sigma_{ij}^2$ is a scaling factor for receive antenna j, "*" denotes a complex conjugate, and $z_i$ is a combined data symbol.

The terminal may estimate the channel gain $h_{ij}$ and the noise variance $\sigma_{ij}^2$ for each receive antenna based on the received pilot symbols from that antenna using various channel estimation techniques known in the art. The scaling factor $h_{ij}^*/\sigma_{ij}^2$ is indicative of the received signal quality for receive antenna j.

The base station may transmit data and pilot in tiles. A tile may be a block of M subcarriers in N symbol periods and may also be referred to as a resource block, a time frequency block, etc. For UMB, a tile covers 16 subcarriers in 8 symbol periods. For LTE, a resource block covers 12 subcarriers in 6 or 7 symbol periods. The terminal may combine received data symbols across all receive antennas for each tile. The terminal may then process the combined data symbols as if they are obtained from one antenna. Quantities that are antenna-specific, such as the received data symbols $y_{ij}$, the channel gain $h_{ij}$, and the noise variance $\sigma_{ij}^2$, may not be available. Instead, the combined data symbols $z_i$ and an SINR estimate may be available. The SINR estimate may be expressed as:

$$SINR_i = \sum_j \frac{|h_{ij}|^2}{\sigma_{ij}^2}, \qquad \text{Eq (8)}$$

where $SINR_i$ is an SINR estimate for transmitted data symbol $x_i$. SINR may also be referred to as signal-to-noise ratio (SNR), received signal quality, etc.

The combined data symbols may be expressed as a function of SINR, as follows:

$$z_i = \sum_j \frac{|h_{ij}|^2 \cdot x_i \cdot \sqrt{D2P}}{\sigma_{ij}^2} + \tilde{n}_i = SINR_i \cdot x_i \cdot \sqrt{D2P} + \tilde{n}_i, \quad \text{Eq (9)}$$

where $$\tilde{n}_i = \sum_j \frac{h_{ij}^* \cdot n_{ij}}{\sigma_{ij}^2}$$

is the total noise for data symbol $x_i$ with a variance of $SINR_i$.

The combined data symbols in equation (9) have the same form as the received data symbols in equation (1). In particular, $h_i$ in equation (1) may be replaced with $SINR_i$ in equation (9). The noise $n_i$ in equation (1) has a variance of $\sigma_i^2$ whereas the noise $\tilde{n}_i$ in equation (9) has a variance of $SINR_i$. D2P may thus be estimated using any of the designs shown in equations (2) to (5). For example, D2P may be estimated based on the combined data symbols using the design shown in equation (4), as follows:

$$D2P\_est_d = \frac{\sum_i (|z_i|^2 - SINR_i)}{\sum_i SINR_i^2}. \quad \text{Eq (10)}$$

D2P may also be estimated based on the combined data symbols using the design shown in equation (2), (3) or (5) or some other equation. The numerator term may be constrained to be non-negative based on any of the designs described above.

Equations (3), (4), (5) and (10) may be used to estimate D2P for a transmission with the same D2P. The shared control channel may be sent on multiple tiles, and the D2P for the terminal may be different in different tiles. For example, different pilot power levels may be used in different tiles while the data power level for terminal may be the same in all tiles. In one design, D2P may be estimated for each tile based on the data symbols and the pilot symbols from that tile. In another design, a single D2P may be estimated based on all data symbols and all pilot symbols from all tiles. In yet another design, D2P may be estimated for each tile based on the pilot symbols from that tile and the data symbols from all tiles, as follows:

$$D2P\_est_e = \frac{\sum_{k=1...T} \sum_i \frac{|z_{ki}|^2 - SINR_{ki}}{SINR_{ki}}}{T \cdot \sum_i SINR_{ki}}, \quad \text{Eq (11)}$$

where k is a tile index and i is a symbol index within a tile,

T is the number of tiles, with each tile having the same pilot power level, $z_{ki}$ is a combined data symbol from tile k, and $SINR_{ki}$ is an SINR estimate for combined data symbol $z_{ki}$.

The design in equation (11) may provide a more accurate D2P estimate for each tile by using more data symbols for the numerator term for better averaging and by using pilot symbols from each tile.

The terminal may use the D2P estimate for various purposes such as demodulation, decoding, etc. For example, the D2P estimate may be used to calculate a priori log-likelihood ratios (LLRs) for code bits generated by a Turbo encoder or some other type of encoder. The LLRs may then be provided as inputs to a Turbo decoder and used to derive decoded data. The D2P estimate may also be used by demodulators and decoders to calculate other decision metrics.

Figure 3:
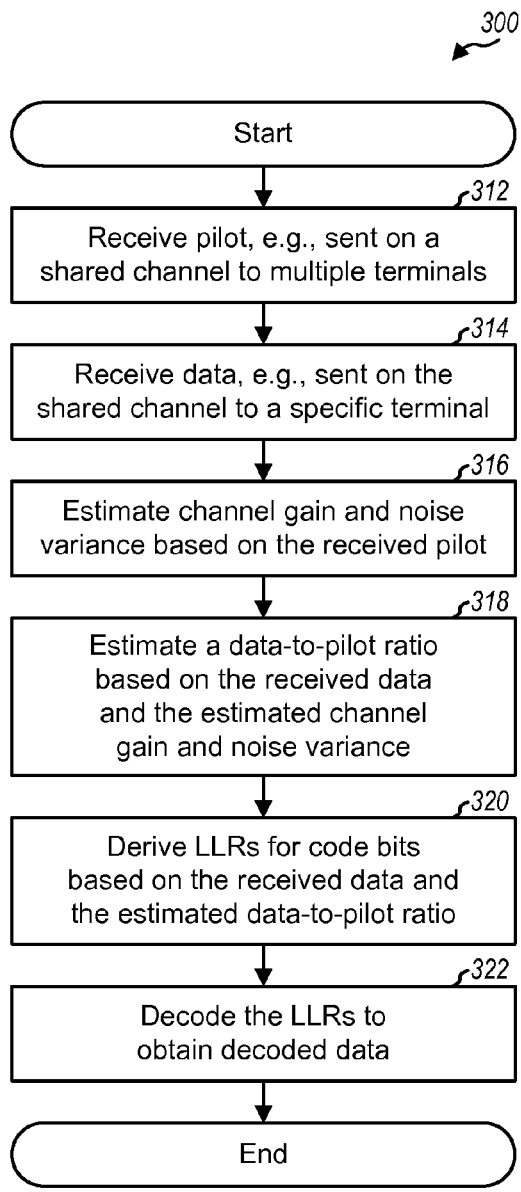
FIG. 3 shows a process for receiving data and pilot.

FIG. 3 shows a design of a process 300 for receiving data and pilot in a wireless communication system. Process 300 may be performed by a terminal (as described below) or by some other entity. The terminal may receive pilot, e.g., sent on a shared channel to multiple terminals (block 312). The terminal may also receive data, e.g., sent on the shared channel to the terminal (block 314). For blocks 312 and 314, the terminal may receive at least one pilot symbol and at least one data symbol sent on multiple subcarriers with OFDM. The terminal may also receive the pilot and data symbols via some other multiplexing scheme. In any case, the terminal may estimate channel gain and noise variance based on the received pilot (block 316). The terminal may then estimate a data-to-pilot ratio based on the received data and the estimated channel gain and noise variance (block 318). In one design of block 318, the terminal may determine a first quantity (e.g., $|y|^2 - \sigma^2$) based on the received data y and the estimated noise variance $\sigma^2$. The terminal may determine a second quantity (e.g., $|h|^2$) based on the estimated channel gain h. The terminal may then estimate the data-to-pilot ratio based on the first and second quantities.

The received data may comprise multiple received data symbols. The data-to-pilot ratio may be estimated based on a metric $$\frac{|y_i|^2 - \sigma_i^2}{|h_i|^2},$$

where $y_i$ represents the i-th received data symbol, $h_i$ represents the estimated channel gain for the i-th received data symbol, and $\sigma_i^2$ represents the estimated noise variance for the i-th received data symbol. In one design, the terminal may average the metric across the multiple received data symbols and determine the data-to-pilot ratio based on the averaged metric, e.g., as shown in equation (3). In another design, the terminal may average the numerator of the metric across the multiple received data symbols, average the denominator of the metric across the multiple received data symbols, and determine the data-to-pilot ratio based on the averaged numerator and the averaged denominator, e.g., as shown in equation (4). In yet another design, the terminal may scale the numerator of the metric with a scaling factor (e.g., $|h_i|^2$) determined based on the estimated channel gain, scale the denominator of the metric with the scaling factor, average the scaled numerator across the multiple received data symbols, average the scaled denominator across the multiple received data symbols, and determine the data-to-pilot ratio based on the averaged scaled numerator and the averaged scaled denominator, e.g., as shown in equation (5). The numerator of the metric or a quantity derived based on the numerator of the metric may be constrained to be non-negative.

The terminal may receive the pilot and data via multiple receive antennas and may combine the received data across the multiple receive antennas (e.g., with MRC) to obtain combined data. For block 316, the terminal may estimate channel gain $h_{ij}$ and noise variance $\sigma_{ij}^2$ for each receive antenna based on the pilot received via that antenna. The terminal may then estimate SINR based on the estimated channel gain and noise variance for the multiple receive antennas, e.g., as shown in equation (8). For block 318, the terminal may estimate the data-to-pilot ratio based on the combined data and the estimated SINR. The combined data may comprise multiple combined data symbols. The data-to-pilot ratio may then be estimated based on a metric $$\frac{|z_i|^2 - SINR_i}{SINR_i^2},$$

where $z_i$ represents the i-th combined data symbol, and $SINR_i$ represents the estimated SINR for the i-th combined data symbol. The terminal may average the metric using any of the averaging schemes described above to obtain the data-to-pilot ratio. The numerator of the metric or a quantity derived based on the numerator of the metric may be constrained to be non-negative.

The terminal may derive LLRs for code bits based on the received data and the estimated data-to-pilot ratio (block 320). The terminal may then decode the LLRs to obtain decoded data (block 322).

Figure 4:
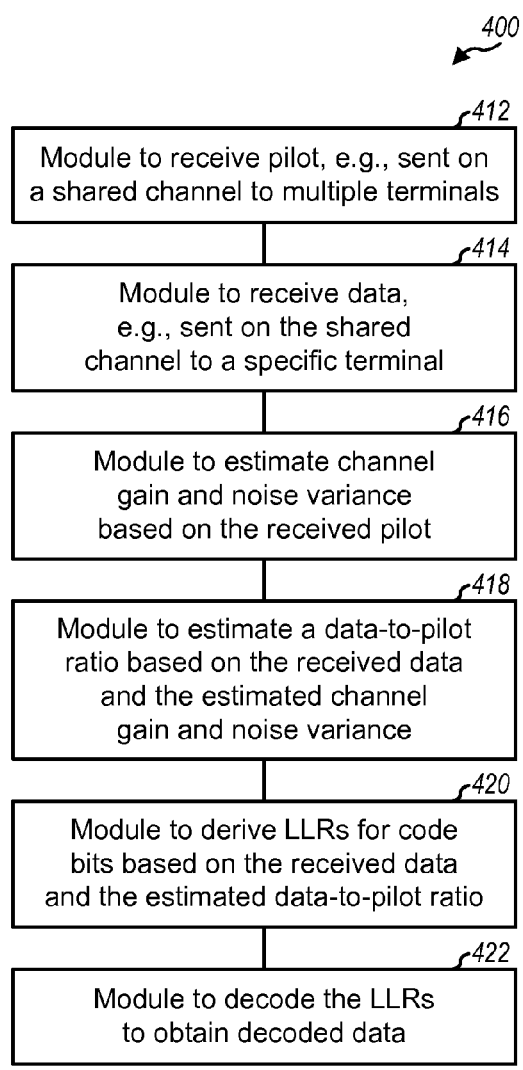
FIG. 4 shows an apparatus for receiving data and pilot.

FIG. 4 shows a design of an apparatus 400 for receiving data and pilot in a wireless communication system. Apparatus 400 includes a module 412 to receive pilot, e.g., sent on a shared channel to multiple terminals, a module 414 to receive data, e.g., sent on the shared channel to a specific terminal, a module 416 to estimate channel gain and noise variance based on the received pilot, a module 418 to estimate a data-to-pilot ratio based on the received data and the estimated channel gain and noise variance, a module 420 to derive LLRs for code bits based on the received data and the estimated data-to-pilot ratio, and a module 422 to decode the LLRs to obtain decoded data.

FIG. 5 shows a design of a process 500 for transmitting data and pilot in a wireless communication system. Process 500 may be performed by a base station (as described below) or by some other entity. The base station may send pilot at a predetermined power level to multiple terminals (block 512). The base station may send data to each of the multiple terminals at a power level determined based on a data-to-pilot ratio for that terminal (block 514). Each terminal may estimate its data-to-pilot ratio based on the data sent to that terminal and the pilot sent to the multiple terminals. For block 514, the base station may receive channel quantity indicator (CQI) information from each terminal. The base station may determine the power level of the data sent to each terminal based on the CQI information received from that terminal. The base station may vary the power level of the data sent to each terminal without informing the terminal of the changes to the power level (block 516).

In another design, the base station may determine the power level of the data sent to each terminal based on the CQI information received from that terminal and a target power level. The base station may then select the power level of the pilot such that it satisfies the D2P of the terminal requiring the highest boost in data transmit power among the multiple terminals using the pilot. This design may be considered as equivalent to the design shown in blocks 512 and 514. In general, the power level of the data sent to each terminal and the power level of the pilot may be set in various manners to achieve the desired performance for each terminal.

In one design, the data sent to each terminal may comprise control data. The base station may send the pilot and control data on a shared control channel to the multiple terminals. In another design, the data sent to each terminal may comprise traffic data. The base station may send the pilot and traffic data on a shared data channel to the multiple terminals.

FIG. 6 shows a design of an apparatus 600 for transmitting data and pilot in a wireless communication system. Apparatus 600 includes a module 612 to send pilot at a predetermined power level to multiple terminals, a module 614 to send data to each of the multiple terminals at a power level determined based on a data-to-pilot ratio for that terminal, and a module 616 to vary the power level of the data sent to each terminal without informing the terminal of the changes to the power level.

The modules in FIGS. 4 and 6 may comprise processors, electronics devices, hardware devices, electronics components, logical circuits, memories, etc., or any combination thereof.

Figure 7:
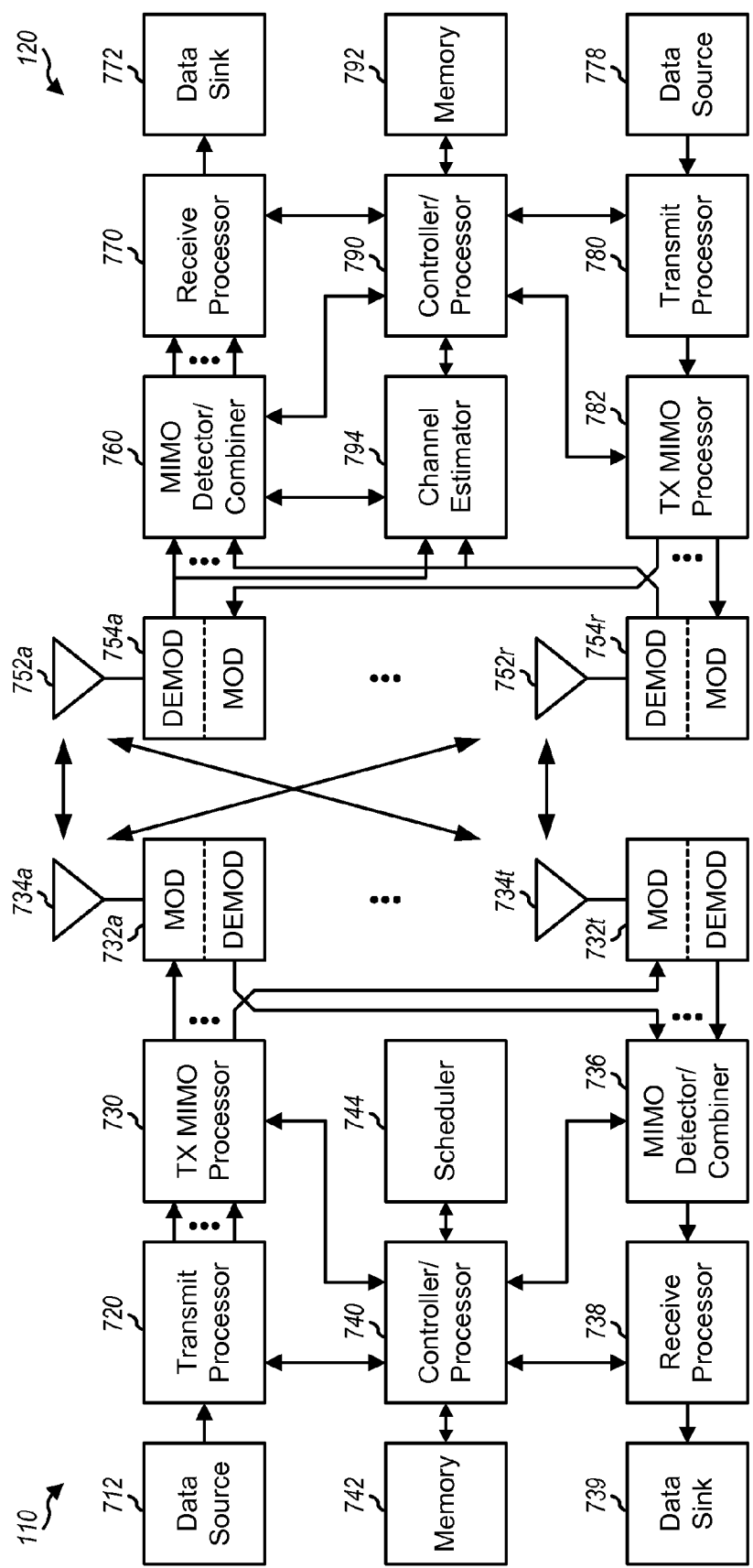
FIG. 7 shows a block diagram of a base station and a terminal.

FIG. 7 shows a block diagram of a design of base station 110 and terminal 120, which is one of the terminals in FIG. 1. In this design, base station 110 is equipped with T antennas 734a through 734t, and terminal 120 is equipped with R antennas 752a through 752r, where in general $T \geq 1$ and $R \geq 1$.

At base station 110, a transmit processor 720 may receive traffic data for terminals from a data source 712 and may receive control data for the terminals from a controller/processor 740. Transmit processor 720 may process the data for each terminal based on one or more modulation and coding schemes selected for that terminal and provide data symbols for all terminals. Transmit processor 720 may also generate pilot symbols. A transmit (TX) multiple-input multiple-output (MIMO) processor 730 may multiplex the data symbols and pilot symbols, perform spatial processing (e.g., preceding) on the multiplexed symbols if applicable, and provide T output symbol streams to T modulators (MODs) 732a through 732t. Each modulator 732 may process a respective output symbol stream (e.g., for OFDM) to obtain an output chip stream. Each modulator 732 may further process (e.g., convert to analog, amplify, filter, and upconvert) the output chip stream to obtain a forward link signal. T forward link signals from modulators 732a through 732t may be transmitted via T antennas 734a through 734t, respectively.

At terminal 120, antennas 752a through 752r may receive the forward link signals from base station 110 and provide received signals to demodulators (DEMODs) 754a through 754r, respectively. Each demodulator 754 may condition (e.g., filter, amplify, downconvert, and digitize) a respective received signal to obtain samples and may further process the samples (e.g., for OFDM) to obtain received pilot symbols and received data symbols. A channel estimator 794 may obtain received pilot symbols from all R demodulators 754a through 754r and may estimate channel gain, noise variance and/or SINR based on the received pilot symbols. A MIMO detector/combiner 760 may obtain received data symbols from all R demodulators 754a through 754r, perform MIMO detection or MRC combining on the received data symbols, and provide combined data symbols. A receive processor 770 may process (e.g., demodulate, deinterleave, and decode) the combined data symbols, provide decoded traffic data for terminal 120 to a data sink 772, and provide decoded control data for terminal 120 to a controller/processor 790.

On the reverse link, at terminal 120, traffic data from a data source 778 and control data (e.g., CQI information) from controller/processor 790 may be processed by a transmit processor 780, further processed by a TX MIMO processor 782 if applicable, conditioned by modulators 754a through 754r, and transmitted to base station 110. At base station 110, the reverse link signals from terminal 120 may be received by antennas 734, conditioned by demodulators 732, processed by a MIMO detector/combiner 736, and further processed by a receive processor 738 to obtain the traffic data and control data transmitted by terminal 120.

Controllers/processors 740 and 790 may direct the operation at base station 110 and terminal 120, respectively. Controller/processor 790 may perform or direct process 300 in FIG. 3 and/or other processes for the techniques described herein. Controller/processor 740 may perform or direct process 500 in FIG. 5 and/or other processes for the techniques described herein. Memories 742 and 792 may store data and program codes for base station 110 and terminal 120, respectively. A scheduler 744 may schedule terminals for data transmission on the forward and/or reverse link and may provide assignments of resources for the scheduled terminals.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for wireless communication, comprising:
   estimating channel gain and noise variance based on a received pilot; and
   estimating a data-to-pilot ratio based on received data and the estimated channel gain and noise variance, wherein the received data comprises multiple received data symbols, and wherein the data-to-pilot ratio is estimated based on a metric $$\frac{|y_i|^2 - \sigma_i^2}{|h_i|^2},$$

where i is an index for the received data symbols, $y_i$ represents i-th received data symbol, $h_i$ represents estimated channel gain for the i-th received data symbol, and $\sigma_i^2$ represents estimated noise variance for the i-th received data symbol.

2. The method of claim 1, further comprising:
   receiving pilot sent on a shared channel to multiple terminals; and
   receiving data sent on the shared channel to a specific terminal.

3. The method of claim 1, wherein the estimating the data-to-pilot ratio comprises determining a first quantity based on the received data and the estimated noise variance,
determining a second quantity based on the estimated channel gain, and
estimating the data-to-pilot ratio based on the first and second quantities.

4. The method of claim 1, wherein the estimating the data-to-pilot ratio comprises
averaging the metric across the multiple received data symbols, and
determining the data-to-pilot ratio based on the averaged metric.

5. The method of claim 1, wherein the estimating the data-to-pilot ratio comprises
averaging numerator of the metric across the multiple received data symbols,
averaging denominator of the metric across the multiple received data symbols, and
determining the data-to-pilot ratio based on the averaged numerator and the averaged denominator.

6. The method of claim 1, wherein the estimating the data-to-pilot ratio comprises
scaling numerator of the metric with a scaling factor determined based on the estimated channel gain,
scaling denominator of the metric with the scaling factor,
averaging the scaled numerator across the multiple received data symbols,
averaging the scaled denominator across the multiple received data symbols, and
determining the data-to-pilot ratio based on the averaged scaled numerator and the averaged sealed denominator.

7. The method of claim 1, wherein the estimating the data-to-pilot ratio comprises constraining numerator of the metric or a quantity derived based on the numerator of the metric to be non-negative.

8. The method of claim 1, further comprising:
deriving log-likelihood ratios (LLRs) for code bits based on the received data and the estimated data-to-pilot ratio; and
decoding the LLRs to obtain decoded data 9. The method of claim 1, further comprising:
receiving at least one pilot symbol and at least one data symbol sent on multiple subcarriers with orthogonal frequency division multiplexing (OFDM), wherein the received pilot comprises the at least one received pilot symbol and the received data comprises the at least one received data symbol.

10. A method for wireless communication, comprising:
receiving pilot via multiple receive antennas;
receiving data via the multiple receive antennas;
combining the received data across the multiple receive antennas to obtain combined data;
estimating signal-to-noise-and-interference ratio (SINR) based on the received pilot from the multiple receive antennas; and
estimating a data-to-pilot ratio based on the combined data and the estimated SINR,
wherein the received data comprises multi received data symbols, and wherein the data-to-pilot ratio is estimated based on a metric $$\frac{|y_i|^2 - \sigma_i^2}{|h_i|^2},$$

where i is an index for the received data symbols, $y_i$ represents i-th received data symbol, $h_i$ represents estimated channel for the i-th received data symbol, and $\sigma_i^2$ represents estimated noise variance for the i-th received data symbol.

11. The method of claim 10, wherein the estimating the SINR comprises
estimating channel gain and noise variance for each receive antenna based on the pilot received via the receive antenna, and
estimating the SINR based on estimated channel gain and noise variance for the multiple receive antennas.

12. The method of claim 10, wherein the combining the received data comprises combining the received data across the multiple receive antennas with maximal ratio combining (MRC) to obtain the combined data.

13. The method of claim 10, wherein the combined data comprises multiple combined data symbols, and wherein the data-to-pilot ratio is estimated based On a metric $$\frac{|z_i|^2 - SINR_i}{SINR_i^2},$$

where i is an index for the combined data symbols, $z_i$ represents i-th combined data symbol, and $SINR_i$ represents estimated SINR for the i-th combined data symbol.

14. The method of claim 10, wherein the estimating the data-to-pilot ratio comprises constraining numerator of the metric or a quantity derived based on the numerator of the metric to be non-negative.

15. The method of claim 10, wherein the combined data comprises combined data symbols from multiple tiles, and wherein the data-to-pilot ratio is estimated for each tile based on pilot symbols from the tile and combined data symbols from the multiple tiles.

16. An apparatus for wireless communication, comprising:
at least one processor configured to estimate channel gain and noise variance based on a received pilot, and to estimate a data-to-pilot ratio based on received data and the estimated channel gain and noise variance, wherein the received data comprises multiple received data symbols, and wherein the data-to-pilot ratio is estimated based on a metric $$\frac{|y_i|^2 - \sigma_i^2}{|h_i|^2},$$

where i is an index for the received data symbols, $y_i$ represents i-th received data symbol, $h_i$ represents estimated channel gain for the i-th received data symbol, and $\sigma_i^2$ represents estimated noise variance for the i-th received data symbol.

17. The apparatus of claim 16, wherein the at least one processor is configured to determine a first quantity based on the received data and the estimated noise variance, to determine a second quantity based on the estimated channel gain, and to estimate the data-to-pilot ratio based on the first and second quantities, 18. The apparatus of claim 16, wherein the at least one processor is configured to average numerator of the metric across the multiple received data symbols, to average denominator of the metric across the multiple received data symbols, and to determine the data-to-pilot ratio based on the averaged numerator and the averaged denominator.

19. The apparatus of claim 16, wherein the at least one processor is configured to receive pilot via multiple receive antennas, to receive data via the multiple receive antennas, to combine the received data across the multiple receive antennas to obtain combined data, to estimate signal-to-noise-and-interference ratio (SINR) based on the received pilot from the multiple receive antennas, and to estimate the data-to-pilot ratio based on the combined data and the estimated SINR.

20. The apparatus of claim 19, wherein the combined data comprises multiple combined data symbols, and wherein the data-to-pilot ratio is estimated based on a metric $$\frac{|z_i|^2 - SINR_i}{SINR_i^2},$$

where i is an index for the combined data symbols, $z_i$ represents i-th combined data symbol, and $SINR_i$ represents estimated SINR for the i-th combined data symbol.

21. An apparatus for wireless communication, comprising:
means for estimating channel gain and noise variance based on a received pilot; and
means for estimating a data-to-pilot ratio based on received data and the estimated channel gain and noise variance, wherein the received data comprises multiple received data symbols, and wherein the data-to-pilot ratio is estimated based on a metric $$\frac{|y_i|^2 - \sigma_i^2}{|h_i|^2},$$

where i is an index for the received data symbols, $y_i$ represents i-th received data symbol, $h_i$ represents estimated channel gain for the i-th received data symbol, and $\sigma_i^2$ represents estimated noise variance for the i-th received data symbol.

22. The apparatus of claim 21, wherein the means for estimating the data-to-pilot ratio comprises
means for determining a first quantity based on the received data and the estimated noise variance,
means for determining a second quantity based on the estimated channel gain, and
means for estimating the data-to-pilot ratio based on the first and second quantities.

23. The apparatus of claim 19, wherein the means for estimating the data-to-pilot ratio comprises
means for averaging numerator of the metric across the multiple received data symbols,
means for averaging denominator of the metric across the multiple received data symbols, and
means for determining the data-to-pilot ratio based on the averaged numerator and the averaged denominator.

24. The apparatus of claim 21, further comprising:
means for receiving pilot via multiple receive antennas;
means for receiving data via the multiple receive antennas;
means for combining the received data across the multiple receive antennas to obtain combined data; and
means for estimating signal-to-noise-and-interference ratio (SINR) based on the received pilot from the multiple receive antennas,
wherein the means for estimating the data-to-pilot ratio comprises
means for estimating the data-to-pilot ratio based on the combined data and the estimated SINR.

25. The apparatus of claim 24, wherein the combined data comprises multiple combined data symbols, and wherein the data-to-pilot ratio is estimated based on a metric $$\frac{|z_i|^2 - SINR_i}{SINR_i^2},$$

where i is an index for the combined data symbols, $z_i$ represents i-th combined data symbol, and $SINR_i$ represents estimated SINR for the i-th combined data symbol.

26. A computer-readable storage medium having stored thereon instructions that, when executed, cause one or more processors of a device for coding video data to:
estimate channel gain and noise variance based on a received pilot; and
estimate a data-to-pilot ratio based on received data and the estimated channel gain and noise variance, wherein the received data comprises multiple received data symbols, and wherein the data-to-pilot ratio is estimated based on a metric $$\frac{|y_i|^2 - \sigma_i^2}{|h_i|^2},$$

where i is an index for the received data symbols, $y_i$ represents i-th received data symbol, $h_i$ represents estimated channel gain for the i-th received data symbol, and $\sigma_i^2$ represents estimated noise variance for the i-th received data symbol.

27. An apparatus for wireless communication, comprising:
at least one processor configured to:
receive a pilot via multiple receive antennas;
receive data via the multiple receive antennas;
combine the received data across the multiple receive antennas to obtain combined data;
estimate signal-to-noise-and-interference ratio (SINR) based on the received pilot from the multiple receive antennas; and
estimate a data-to-pilot ratio based on the combined data and the estimated SINR,
wherein the received data comprises multiple received data symbols, and wherein the data-to-pilot ratio is estimated based on a metric $$\frac{|y_i|^2 - \sigma_i^2}{|h_i|^2},$$

where i is an index for the received data symbols, $y_i$ represents i-th received data symbol, $h_i$ represents estimated, channel gain for the i-th received data symbol, and $\sigma_i^2$ represents estimated noise variance for the i-th received data symbol.

28. The apparatus of claim 27, wherein the at least one processor is configured to estimate the SINR by estimating channel gain and noise variance for each receive antenna based on the pilot received via the receive antenna, and estimating the SINR based on estimated channel gain and noise variance for the multiple receive antennas.

29. The apparatus of claim 27, wherein the combined data comprises multiple combined data symbols, and wherein the data-to-pilot ratio is estimated based on a metric $$\frac{|z_i|^2 - SINR_i}{SINR_i^2},$$

where i is an index for the combined data symbols, $z_i$ represents i-th combined data symbol, and $SINR_i$ represents estimated SINR for the i-th combined data symbol.

30. The apparatus of claim 27, wherein the at least one processor is further configured to estimate the data-to-pilot ratio by constraining a numerator of the metric or a quantity derived based on the numerator of the metric to be non-negative.

31. The apparatus of claim 27, wherein the combined data comprises combined data symbols from multiple tiles, and wherein the data-to-pilot ratio is estimated for each tile based on pilot symbols from the tile and combined data symbols from the multiple tiles.

* * * * *